(12) United States Patent
Ooishi

(10) Patent No.: US 10,562,454 B2
(45) Date of Patent: Feb. 18, 2020

(54) ELECTRONIC MIRROR DEVICE

(71) Applicant: Panasonic Intellectual Property Management Co., Ltd., Osaka (JP)

(72) Inventor: Toshiharu Ooishi, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/745,145

(22) PCT Filed: Jul. 25, 2016

(86) PCT No.: PCT/JP2016/003442
§ 371 (c)(1),
(2) Date: Jan. 16, 2018

(87) PCT Pub. No.: WO2017/017946
PCT Pub. Date: Feb. 2, 2017

(65) Prior Publication Data
US 2018/0215315 A1    Aug. 2, 2018

(30) Foreign Application Priority Data

Jul. 30, 2015    (JP) .................... 2015-150320

(51) Int. Cl.
*B60R 1/12* (2006.01)
*B60R 1/04* (2006.01)
(Continued)

(52) U.S. Cl.
CPC .............. *B60R 1/12* (2013.01); *B60R 1/00* (2013.01); *B60R 1/04* (2013.01); *B60R 1/086* (2013.01);
(Continued)

(58) Field of Classification Search
None
See application file for complete search history.

(56) References Cited

U.S. PATENT DOCUMENTS

2007/0222916 A1    9/2007    Kohara et al.
2009/0021668 A1*   1/2009    Cheng ................. G02B 6/0036
                                                              349/65
(Continued)

FOREIGN PATENT DOCUMENTS

EP    1455203 A1    9/2004
EP    2789505 A1    10/2014
(Continued)

OTHER PUBLICATIONS

International Search Report of PCT application No. PCT/JP2016/003442 dated Oct. 4, 2016.
(Continued)

*Primary Examiner* — Phu Vu
(74) *Attorney, Agent, or Firm* — Greenblum & Bernstein, P.L.C.

(57) ABSTRACT

An electronic mirror device is attached to a vehicle interior and is used for rearward visual recognition. The electronic mirror device includes an optical member that reflects incident light from a front surface side and transmits incident light from a rear surface side, and an liquid crystal display that includes a liquid crystal panel disposed on the rear surface side of the optical member and a backlight that irradiates the liquid crystal panel with light, and displays an image of a rear view of the vehicle. A peak angle of the backlight is directed downward with respect to a front direction of the liquid crystal panel.

7 Claims, 10 Drawing Sheets

(51) Int. Cl.
*B60R 1/00* (2006.01)
*B60R 1/08* (2006.01)

(52) U.S. Cl.
CPC ............... *B60R 2001/1253* (2013.01); *B60R 2300/8046* (2013.01); *B60R 2300/8066* (2013.01)

(56) References Cited

U.S. PATENT DOCUMENTS

| | | | |
|---|---|---|---|
| 2014/0085570 A1 | 3/2014 | Kuwata et al. | |
| 2014/0347488 A1* | 11/2014 | Tazaki | B60R 1/04 348/148 |
| 2014/0368657 A1 | 12/2014 | Konuki | |
| 2016/0131823 A1* | 5/2016 | Woodgate | G02B 6/0078 362/612 |
| 2017/0242183 A1* | 8/2017 | Song | G02F 1/133617 |

FOREIGN PATENT DOCUMENTS

| | | |
|---|---|---|
| JP | 11-078693 | 3/1999 |
| JP | 4815930 B | 11/2011 |
| JP | 2012-181389 | 9/2012 |
| JP | 2014-015198 | 1/2014 |
| WO | 2003/040784 | 5/2003 |
| WO | 2012/164795 | 12/2012 |

OTHER PUBLICATIONS

The Extended European Search Report dated May 23, 2018 for the related European Patent Application No. 16830051.5.

* cited by examiner

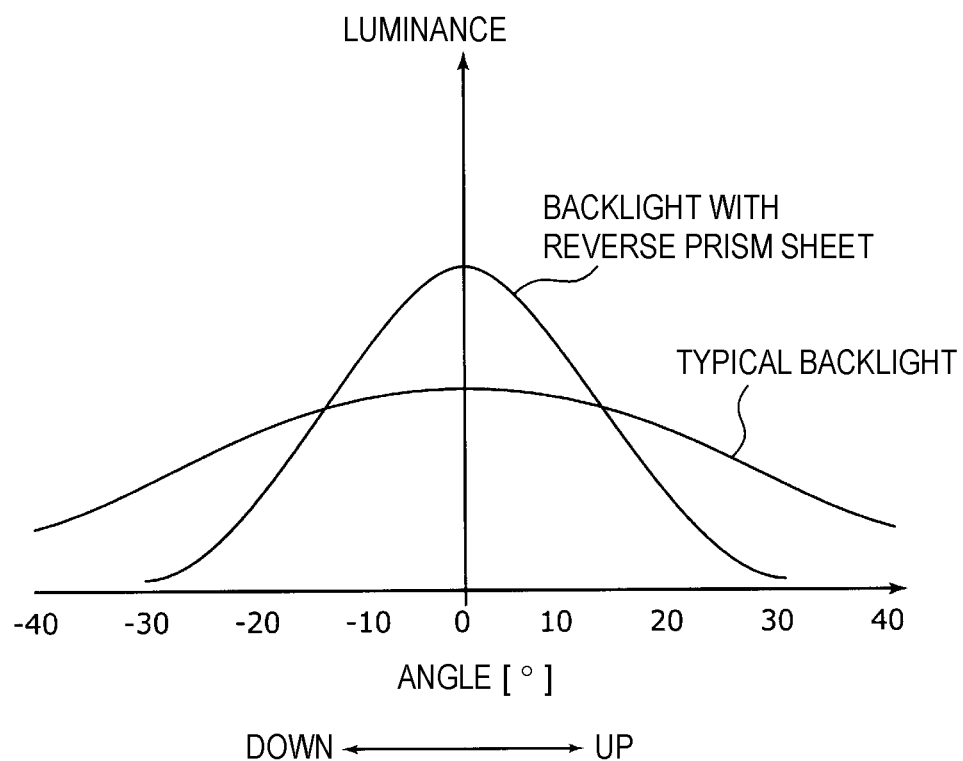

FRONT ← → REAR

ELECTRONIC MIRROR DEVICE

This application is a U.S. national stage application of the PCT International Application No. PCT/JP2016/003442 filed on Jul. 25, 2016, which claims the benefit of foreign priority of Japanese patent application No. 2015-150320 filed on Jul. 30, 2015, the contents all of which are incorporated herein by reference.

TECHNICAL FIELD

The present invention relates to an electronic mirror device that is attached to a vehicle interior and is used for rearward visual recognition.

BACKGROUND ART

A vehicle is obligated to install a rear view mirror in order to secure rearward visibility. Recently, as a rear view mirror attached to a vehicle interior (hereinafter, referred to as an "inside mirror"), an electronic mirror device has been proposed and practically used. The electronic mirror device includes a liquid crystal display for displaying a rear view of the vehicle, and can provide a vivid rear view to a driver in various travelling environments (for example, PTL 1). The electronic mirror device of this type includes a one-way mirror that reflects a part of incident light and transmits a part of the incident light, and a liquid crystal display disposed on a rear surface side of the one-way mirror. The one-way mirror reflects incident light from a front surface side (a side exposed to a driver), and transmits incident light from a rear surface side (a liquid crystal display side).

FIG. 1A and FIG. 1B are views illustrating typical use states of inside mirror 1A applied with the electronic mirror device. As illustrated in FIG. 1A and FIG. 1B, inside mirror 1A is attached near a ceiling in a vehicle interior. An attachment angle of inside mirror 1A is adjusted such that a driver can visually recognize a reflected image of rear view R projected on one-way mirror 11. Angle α formed by a front direction of inside mirror 1A and a sight line direction of the driver is referred to as "sight line angle α". Sight line angle α takes a value within a range defined based on an eyellipse (a region representing a statistical distribution (eye range) of a position of an eye of the driver with an ellipse) for each vehicle type (for example, $2.85° \leq \alpha \leq 10.35°$).

In inside mirror 1A, when liquid crystal display 12 is not turned on, the reflected image projected on one-way mirror 11 is visually recognized (refer to FIG. 1A). On the other hand, when liquid crystal display 12 is turned on, a display image of liquid crystal display 12 is visually recognized through one-way mirror 11 (refer to FIG. 1B). As illustrated in FIG. 1B, a sight line angle when rearward visual recognition is performed by using the display image of liquid crystal display 12 is referred to as "sight line angle β".

FIG. 2 illustrates luminance characteristics of a conventional liquid crystal display. As illustrated in FIG. 2, in the conventional liquid crystal display, luminance of an image is maximized when a liquid crystal panel is viewed from a front direction, and an image in this state is visually recognized most easily. In the following description, a radiation angle of emitted light when luminance of an image is maximized is referred to as a "peak angle", and is denoted by deviation angle $\phi$ in an up/down direction (vertical direction) with a case in which the liquid crystal panel is viewed from the front direction as a reference. Further, a direction in which luminance of the display image of the liquid crystal display is maximized is referred to as a "maximum luminance direction". In other words, in the conventional liquid crystal display, peak angle $\phi$ is 0°, and the front direction is the maximum luminance direction.

Applying an optical member of a beam-converging type (for example, a reverse prism sheet) to a backlight of the liquid crystal display can enhance a luminance peak of the image when the liquid crystal panel is viewed from the front direction, thereby further improving visibility in the front direction in this case. The optical member of the beam-converging type is disclosed in PTL 2, for example.

CITATION LIST

Patent Literature

PTL 1: Unexamined Japanese Patent Publication No. H11-78693
PTL 2: Japanese Patent No. 4,815,930
PTL 3: Unexamined Japanese Patent Publication No. 2012-181389

An object of the present invention is to provide an electronic mirror device that is suitable for an inside mirror and can suppress luminance deterioration of a visually recognized image in an actual-use state, thereby securing excellent visibility.

SUMMARY OF THE INVENTION

An electronic mirror device according to the present invention is an electronic mirror device that is attached to a vehicle interior and is used for rearward visual recognition, the electronic mirror device including: an optical member that reflects incident light from a front surface side, and transmits incident light from a rear surface side; and a liquid crystal display that includes a liquid crystal panel disposed on a rear surface side of the optical member and a backlight that irradiates the liquid crystal panel with light, and displays an image of a rear view of a vehicle, wherein a peak angle of the backlight is directed downward with respect to a front direction of the liquid crystal panel.

According to the present invention, when the peak angle of the backlight is adjusted, a maximum luminance direction of a display image of the liquid crystal display is shifted toward a sight line direction of a driver. Therefore, luminance deterioration of a visually recognized image in an actual-use state can be suppressed, thereby securing excellent visibility.

BRIEF DESCRIPTION OF DRAWINGS

FIG. 2 illustrates luminance characteristics of a conventional liquid crystal display.

DESCRIPTION OF EMBODIMENT

Figure 1A:
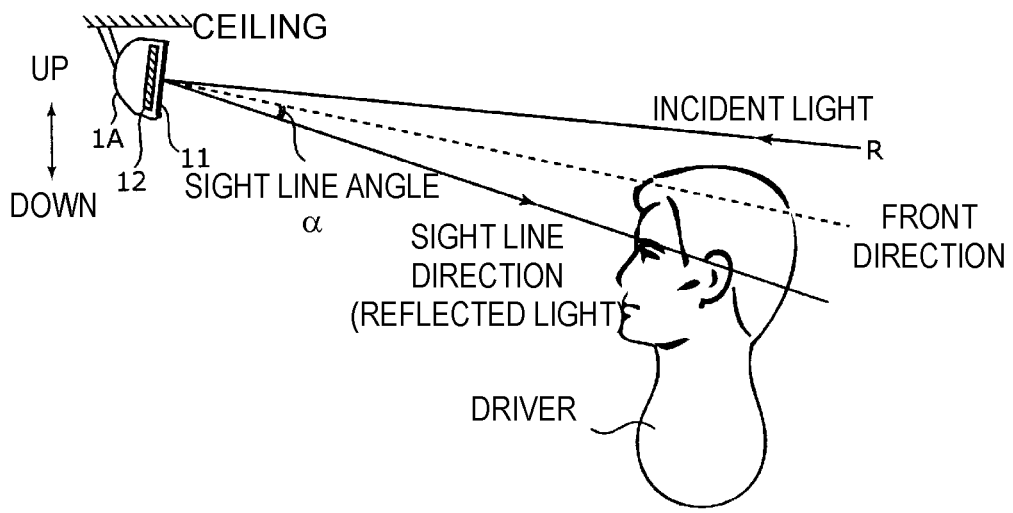
FIG. 1A is a view illustrating a use state of an inside mirror applied with an electronic mirror device.
Figure 1B:
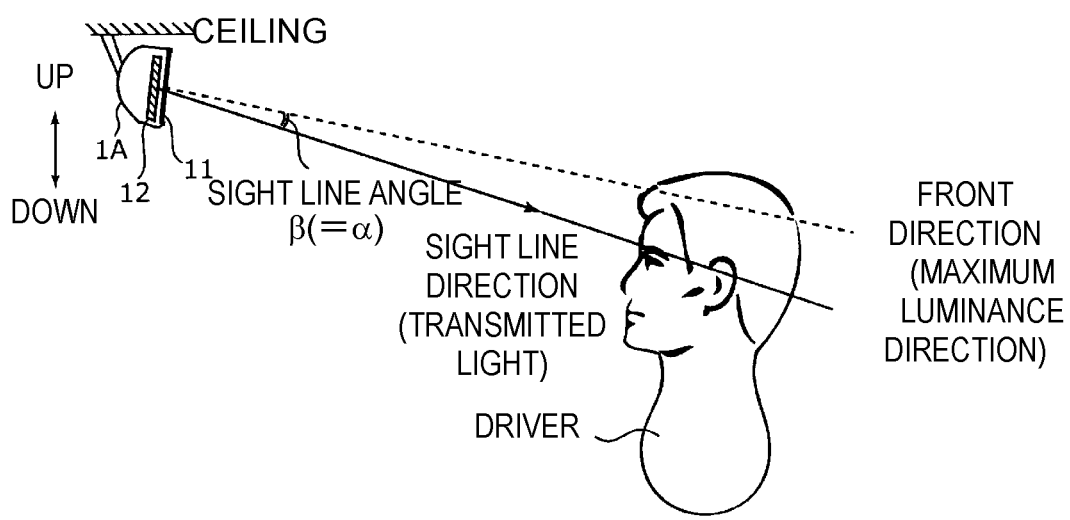
FIG. 1B is a view illustrating the use state of the inside mirror applied with the electronic mirror device.

Prior to describing an exemplary embodiment of the present invention, problems found in a conventional device will be briefly described herein. As illustrated in FIG. 1B, when rearward visual recognition is performed by using a display image of liquid crystal display 12, a driver visually recognizes the display image through one-way mirror 11. Therefore, luminance of an image that is visually recognized (hereinafter, referred to as a "visually recognized image") becomes lower than luminance of an original display image. For example, when luminance not less than 1000 cd/m$^2$ is demanded for the visually recognized image over a half mirror, luminance not less than 2000 cd/m$^2$ is required for the display image of the liquid crystal display. Further, as illustrated in FIG. 1B, the driver visually recognizes the display image of liquid crystal display 12 from downward with respect to a front direction of liquid crystal display 12 (the sight line direction and a maximum luminance direction (front direction) do not coincide with each other). Therefore, luminance of the visually recognized image is decreased in comparison with a case where the display image is visually recognized from the front direction.

As described above, in the inside mirror applied with the electronic mirror device, the luminance of the visually recognized image is decreased, and therefore the visibility is degraded. Furthermore, even when the liquid crystal display is turned on, the reflected image is considerably projected on the one-way mirror. This also degrades the visibility.

Figure 3:
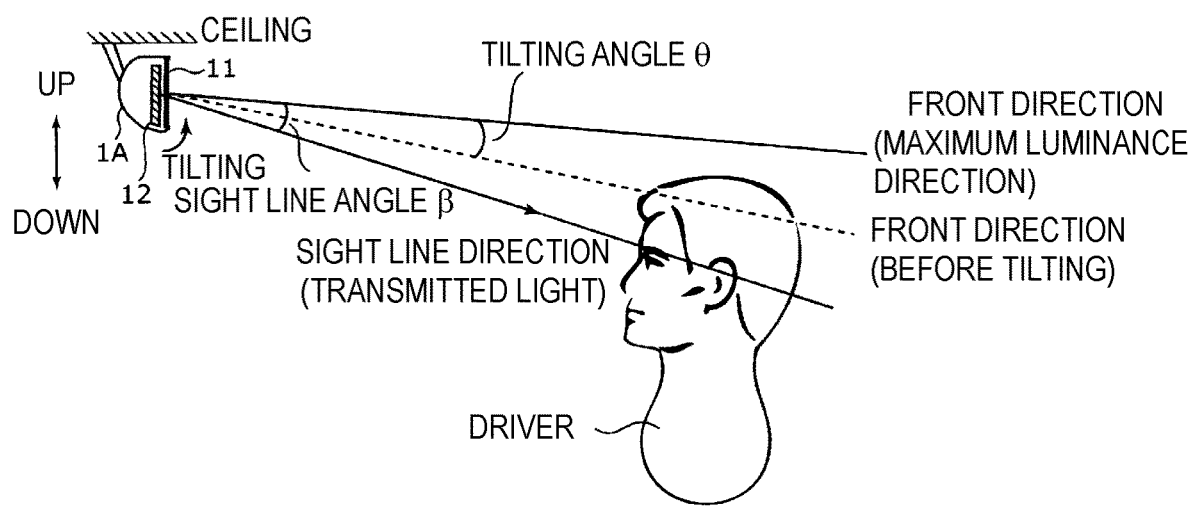
FIG. 3 illustrates a use state when the inside mirror is tilted upward.

The projection of the reflected image on the one-way mirror can be reduced by tilting the inside mirror by tilting angle θ such that the one-way mirror is directed upward (directed to a ceiling in a vehicle interior) (refer to FIG. 3). However, in this case, the sight line direction is further directed downward (sight line angle β=α+θ), and deviation from the maximum luminance direction is made larger. Therefore, the luminance of the visually recognized image is further decreased, and the visibility is further degraded.

The visibility may be improved by increasing an output of a backlight to increase the luminance of the display image. However, addition of a light source of the backlight, for example, a light emitting diode (LED), or an increase in power is not desirable, since it becomes a cause that hinders thinning of the inside mirror, and also encourages a rise in temperature caused by direct sunlight.

Hereinafter, an exemplary embodiment of the present invention will be described in detail with reference to the drawings.

Figure 4:
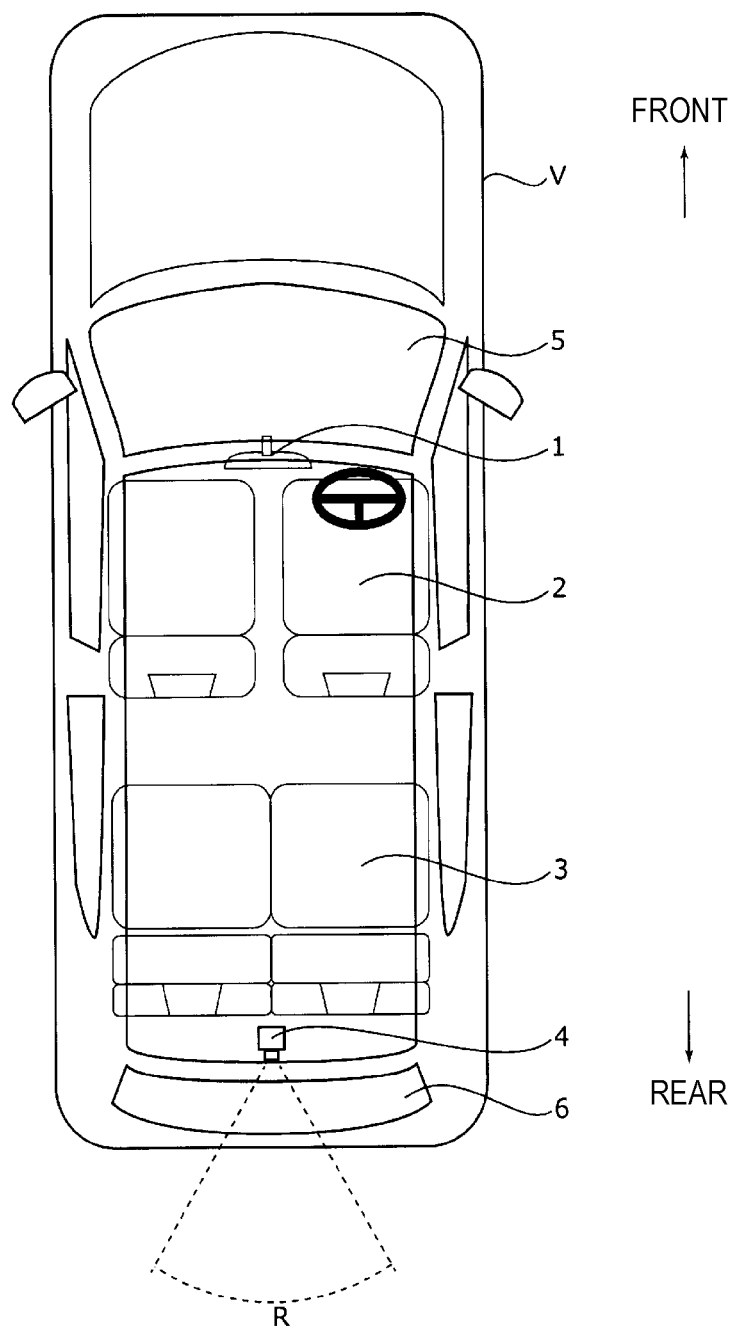
FIG. 4 is a plan view illustrating a vehicle mounting an inside mirror according to an exemplary embodiment.
Figure 5:
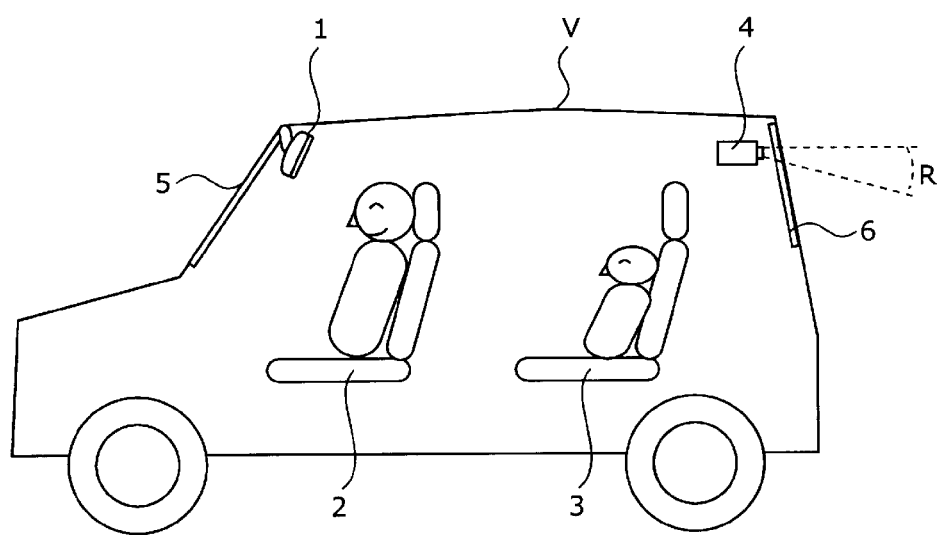
FIG. 5 is a side view illustrating the vehicle mounting the inside mirror according to the exemplary embodiment.

FIG. 4 is a plan view illustrating vehicle V mounting inside mirror 1 according to the exemplary embodiment. FIG. 5 is a side view illustrating vehicle V mounting inside mirror 1 according to the exemplary embodiment.

As illustrated in FIG. 4 and FIG. 5, in a vehicle interior of vehicle V, front seats 2 (a driver seat and a passenger seat) and rear seat 3 are disposed. Windshield 5 is disposed in front of front seats 2, and rear window glass 6 is disposed behind rear seat 3.

Inside mirror 1 is disposed on the upper central part of windshield 5. Inside mirror 1 is hung on, for example, a ceiling of the vehicle interior and is used for rearward visual recognition. An electronic mirror device according to the present invention is applied to this inside mirror 1.

Camera 4 that captures an image of rear view R of vehicle V through rear window glass 6 is disposed behind rear seat 3. Camera 4 may be attached to a vehicle exterior. For example, camera 4 may be incorporated in a rear emblem (not illustrated) or a rear end of a roof (not illustrated) of vehicle V. Camera 4 is connected to inside mirror 1 (liquid crystal display 12 (refer to FIG. 7)) with wired or wireless communication.

Figure 6:
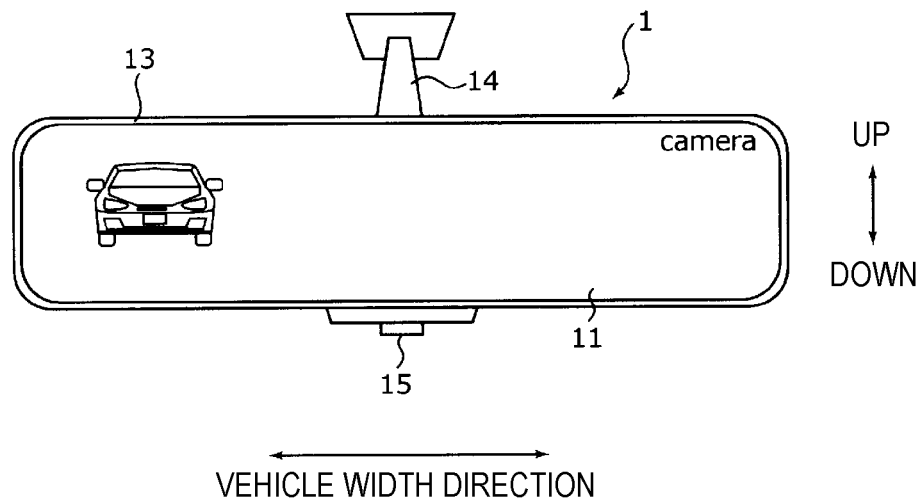
FIG. 6 is a front view of the inside mirror according to the exemplary embodiment.
Figure 7:
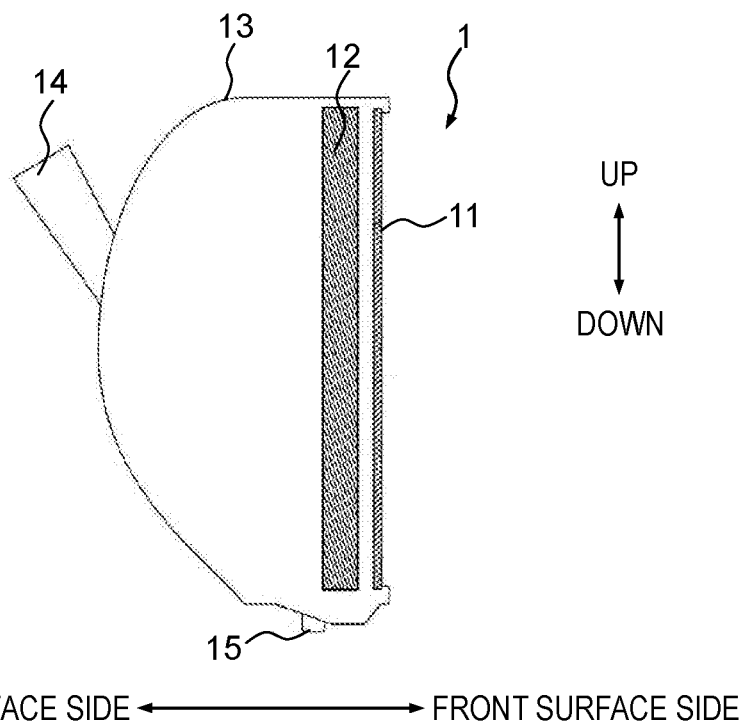
FIG. 7 illustrates an internal configuration of the inside mirror according to the exemplary embodiment.

FIG. 6 is a front view of inside mirror 1. FIG. 7 illustrates an internal configuration of inside mirror 1. As illustrated in FIG. 6 and FIG. 7, inside mirror 1 includes one-way mirror 11, liquid crystal display 12, body case 13, supporter 14, operation lever 15, and the like.

Body case 13 accommodates one-way mirror 11 and liquid crystal display 12. One-way mirror 11 is disposed at a foremost surface (an opening of body case 13), and liquid crystal display 12 is disposed on a rear surface side of one-way mirror 11 (an interior of body case 13). One-way mirror 11 and liquid crystal display 12 can integrally be tilted according to a use state.

One-way mirror 11 is an optical member that reflects incident light from a front surface side, and transmits incident light from a rear surface side. One-way mirror 11 has a rectangular shape long in a vehicle width direction. For example, a half mirror in which its reflectance is equal to its transmittance can be used as one-way mirror 11.

Figure 9:
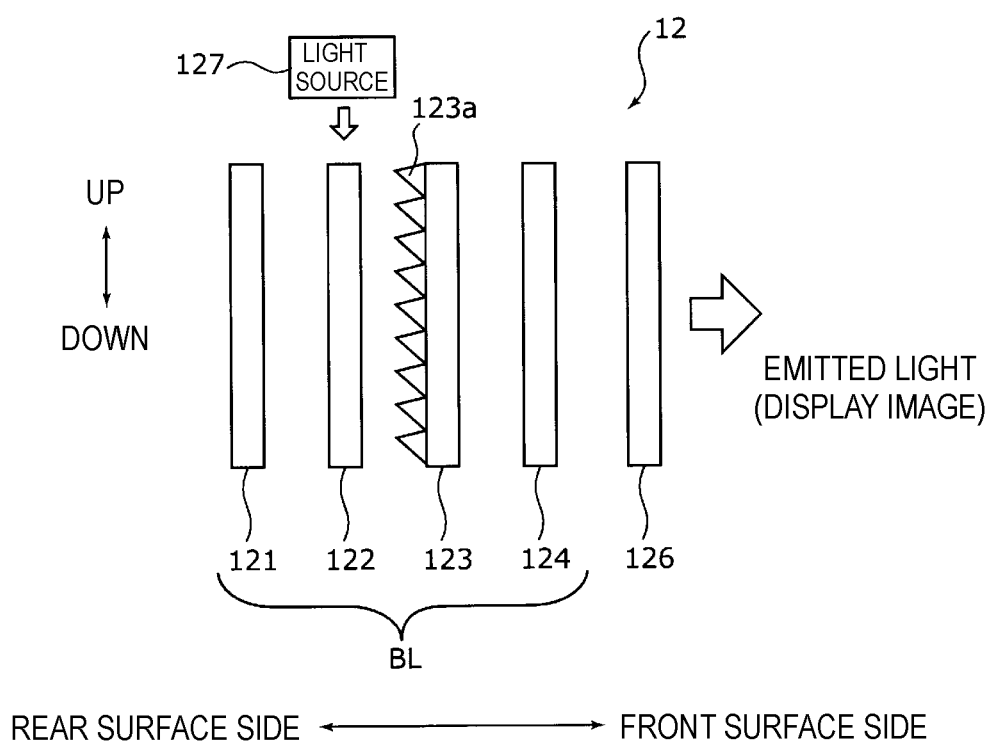
FIG. 9 illustrates a configuration of a liquid crystal display.

Liquid crystal display 12 includes liquid crystal panel 126 and backlight BL (refer to FIG. 9). Liquid crystal display 12 displays an image of rear view R of the vehicle, the image being captured by camera 4. Liquid crystal panel 126 has an external shape similar to an external shape of one-way mirror 11. Backlight BL has peak angle φ directed downward with respect to the front direction of liquid crystal panel 126. In other words, the maximum luminance direction of the display image of liquid crystal display 12 is directed downward with respect to the front direction. A detailed configuration of liquid crystal display 12 (focusing on backlight BL) will be described later.

Supporter 14 is attached to an upper end of windshield 5 or a front end of the ceiling (reference mark is omitted), and rotatably supports body case 13. Body case 13 is rotated with supporter 14 as an axis. Therefore, an attachment angle of inside mirror 1 can be adjusted according to a position of an eye (eye point) of a driver. More specifically, the attachment angle of inside mirror 1 can be adjusted such that the driver can visually recognize the reflected image of rear view R projected on one-way mirror 11.

Figure 8A:
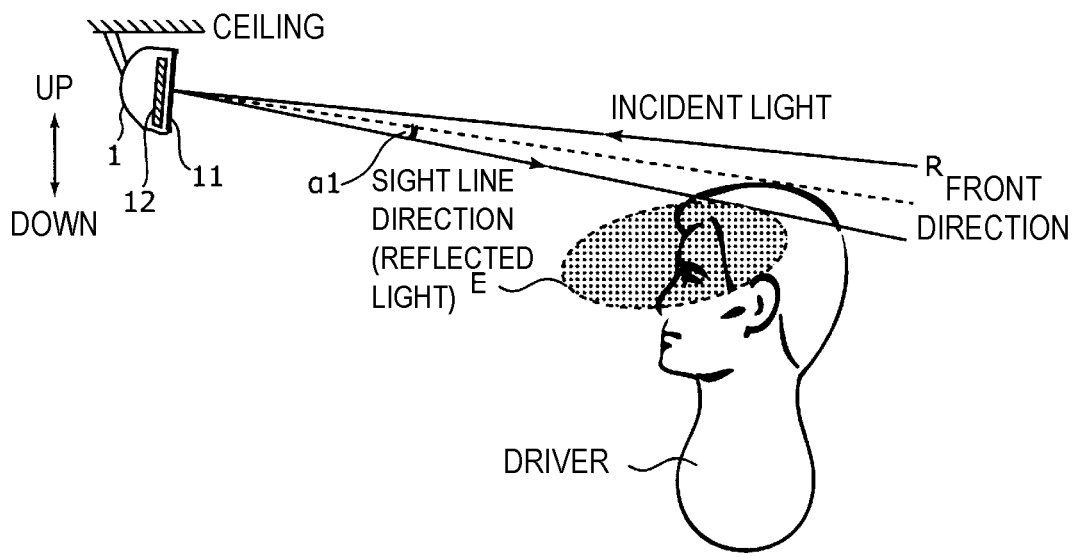
FIG. 8A illustrates a relationship between a sight line angle and an eyellipse.
Figure 8B:
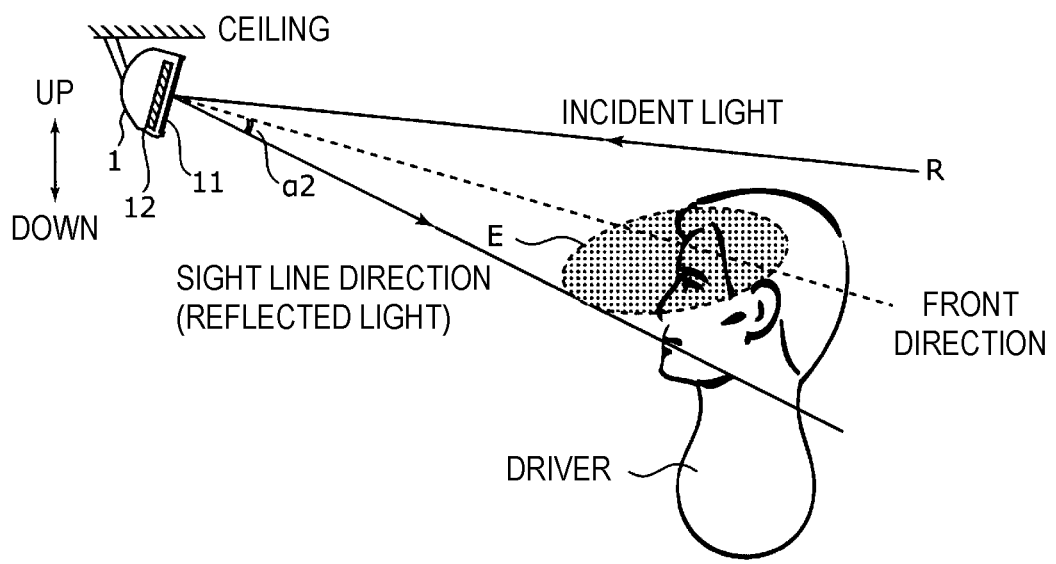
FIG. 8B illustrates a relationship between the sight line angle and the eyellipse.

Angle α (sight line angle α) formed by the front direction of inside mirror 1 and the sight line direction of the driver when rearward visual recognition is performed by using the reflected image projected on one-way mirror 11 takes a value within a range defined based on the eyellipse for each vehicle type. More specifically, as illustrated in FIG. 8A and FIG. 8B, sight line angles α1 and α2 when corresponding sight line directions tangent to eyellipse E are equal to a lower limit value and an upper limit value of a possible range of sight line angle α, respectively. For example, the possible range of sight line angle α is from 2.85° to 10.35°.

Operation lever 15 is a switching mechanism for integrally tilting one-way mirror 11 and liquid crystal display 12 by predetermined tilting angle θ to switch a use state of inside mirror 1. Herein, when operation lever 15 is rotated, body case 13, one-way mirror 11, and liquid crystal display 12 are integrally tilted. Tilting angle θ in this case is 7°, for example. Note that only one-way mirror 11 and liquid crystal display 12 may be integrally tilted inside body case 13, while keeping a posture of body case 13.

More specifically, when operation lever 15 is rotated, the use state of inside mirror 1 is switched to one of a first use state and a second use state, the first use state in which the rearward visual recognition is performed by using the reflected image projected on a mirror surface of one-way mirror 11, and the second use state in which the rearward visual recognition is performed by using the display image of liquid crystal display 12. In the second use state, the mirror surface of one-way mirror 11 is tilted upward more than the first use state. This reduces the projection of the reflected image on one-way mirror 11.

Operation lever 15 also functions as a switch for switching on and off states of liquid crystal display 12. In other words, when operation lever 15 is operated, liquid crystal display 12 shifts from the off state to the on state, in conjunction with switching of the use state of inside mirror 1 from the first use state to the second use state.

In the first use state, liquid crystal display 12 is in the off state, and the driver visually recognizes the reflected image projected on one-way mirror 11. On the other hand, in the second use state, liquid crystal display 12 is in the on state, and the driver visually recognizes the display image of liquid crystal display 12 through one-way mirror 11.

FIG. 9 illustrates a configuration of liquid crystal display 12. As illustrated in FIG. 9, liquid crystal display 12 includes liquid crystal panel 126 on a front surface side of liquid crystal display 12, and backlight BL on a rear surface side of liquid crystal display 12. A controller (not illustrated) including a drive circuit and a power supply circuit operates liquid crystal panel 126. The controller (not illustrated) controls the operation of liquid crystal panel 126 based on information transmitted from camera 4.

Backlight BL includes reflection plate 121, light guiding panel (LGP) 122, prism sheet 123, and diffusion sheet 124 in order from a rear surface side of backlight BL. Further, backlight BL includes light source 127 formed of a plurality of white light emitting diodes (LEDs), for example. Light source 127 is lit during the on state of liquid crystal display 12.

Light guiding panel 122 is a plate-shaped member made of, for example, polycarbonate. Light guiding panel 122 diffuses light from light source 127, which enters from an end surface of light guiding panel 122, and uniformly emits the light toward the front surface side. Reflection plate 121 reflects light leaked on the rear surface side from light guiding panel 122 toward the front surface side. Light guiding panel 122 and reflection plate 121 collectively configure a planar light emitter.

Figure 10:
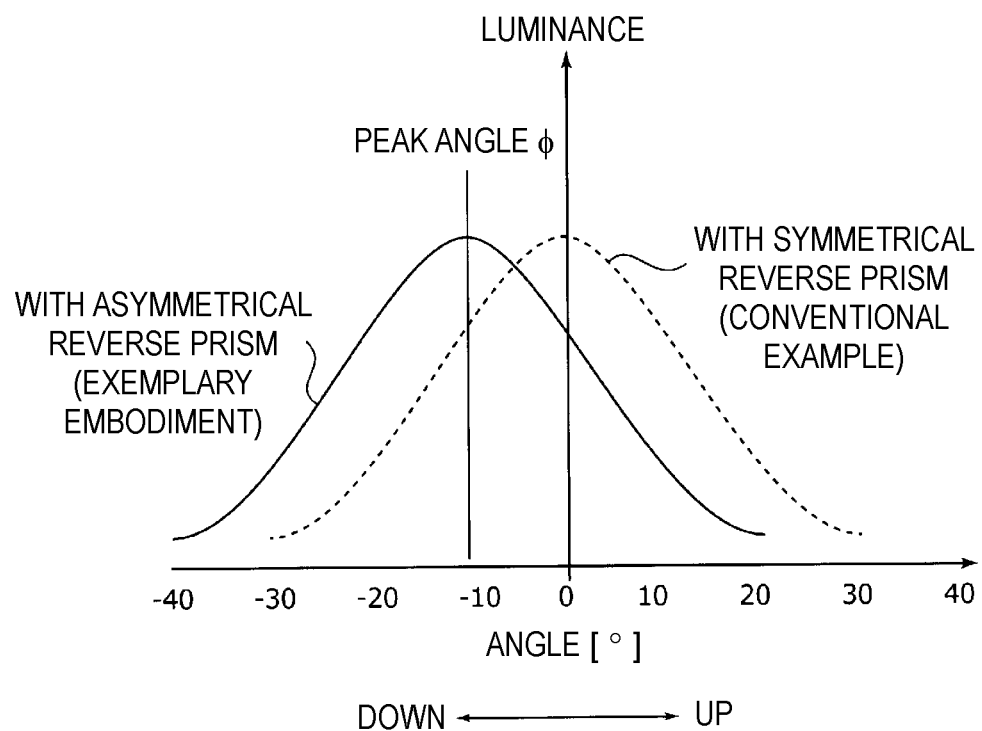
FIG. 10 illustrates a peak angle of the liquid crystal display.

Prism sheet 123 is an optical member having a reverse prism shape, which has prism surface 123a on a rear surface side (light-incident side). According to a shape of prism surface 123a, a light component in a predetermined direction can be increased. For example, when prism surface 123a has a vertically symmetric shape, luminance when viewed from the front direction of liquid crystal panel 126 is increased (refer to FIG. 10). In the present exemplary embodiment, prism surface 123a has an vertically asymmetric shape, thereby controlling peak angle φ to be directed downward with respect to the front direction of liquid crystal panel 126 (refer to FIG. 10). In this case, when the sight line direction is directed downward with respect to the front direction of liquid crystal panel 126, the luminance becomes high.

Note that the shape of prism surface 123a is not particularly limited, as long as the shape can control peak angle φ to be directed downward with respect to the front direction.

Diffusion sheet 124 diffuses light emitted from prism sheet 123.

Liquid crystal panel 126 includes, for example, a liquid crystal layer, two glass substrates holding the liquid crystal layer (including an oriented film, a transparent electrode, and a color filter), and two polarizing plates respectively disposed on outer sides of the two glass substrates. Turning on and off of a voltage applied to the transparent electrode is controlled to vary orientations of liquid crystal molecules, thereby controlling a transmission state of light. The display image is formed by light transmitting through the polarizing plates.

Figure 11A:
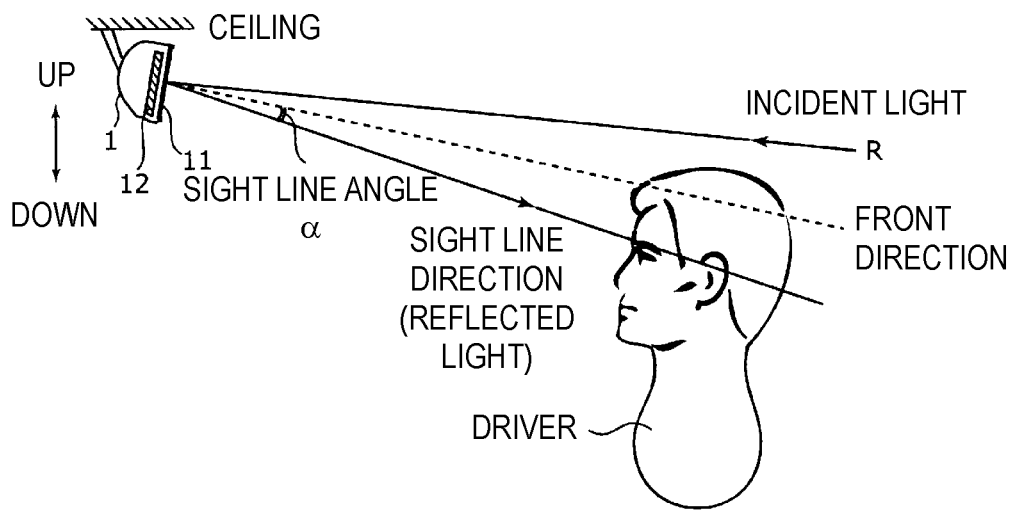
FIG. 11A illustrates a use state of the inside mirror according to the exemplary embodiment.
Figure 11B:
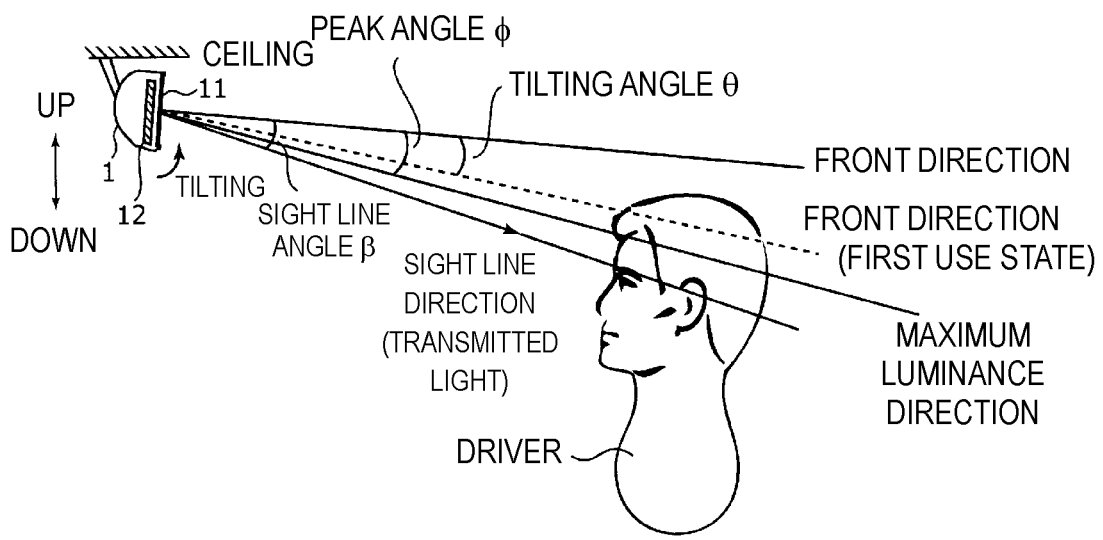
FIG. 11B illustrates a use state of the inside mirror according to the exemplary embodiment.

FIG. 11A and FIG. 11B illustrate the use states of inside mirror 1 according to the present exemplary embodiment. FIG. 11A illustrates the first use state, and FIG. 11B illustrates the second use state.

As illustrated in FIG. 11A and FIG. 11B, in the second use state, the mirror surface of one-way mirror 11 and the display surface of liquid crystal display 12 are directed upward by tilting angle θ, in comparison with the first use state. Accordingly, the sight line direction is directed downward by tilting angle θ with respect to the front direction. In other words, sight line angle β in the second use state is expressed by sight line angle α in the first use state+tilting angle θ.

As illustrated in FIG. 3, in a case of conventional inside mirror 1A, the front direction is the maximum luminance direction of the display image. Therefore, the luminance of the visually recognized image is decreased, thereby degrading the visibility. In contrast, as illustrated in FIG. 11B, in a case of inside mirror 1 according to the present exemplary embodiment, the maximum luminance direction of the display image of liquid crystal display 12 is shifted toward the sight line direction, thereby improving the visibility.

Herein, peak angle φ of backlight BL is preferably larger than tilting angle θ. With this configuration, in comparison with a case in which the display image of liquid crystal display 12 is visually recognized without tilting inside mirror 1 (refer to FIG. 1B), the maximum luminance direction of the display image becomes closer to the sight line direction and further the projection onto one-way mirror 11 is suppressed. This improves the visibility significantly.

When a possible range of sight line angle α in the first use state is from α1 to α2 inclusive, peak angle φ of backlight BL preferably ranges from (θ+α1) to (θ+α2) inclusive. More specifically, when the possible range of sight line angle α is from 2.85° to 10.35° inclusive, and tilting angle θ is 7°, peak angle φ of backlight BL is set from 9.85° to 17.35° inclusive (13.6°±3.75°). With this configuration, in the second use state, the maximum luminance direction of the display image is within a region of eyellipse E (refer to FIGS. 8A and 8B). Therefore, sight line directions of most drivers become closer to the maximum luminance direction of the display image. Accordingly, an image having excellent visibility can be provided.

As described above, inside mirror 1 (electronic mirror device) according to the present exemplary embodiment is the electronic mirror device that is attached to the vehicle interior and is used for the rearward visual recognition. The electronic mirror device includes one-way mirror 11 (optical member) that reflects incident light from a front surface side and transmits incident light from a rear surface side, and liquid crystal display 12 that includes liquid crystal panel 126 disposed on the rear surface side of one-way mirror 11 and backlight BL that irradiates liquid crystal panel 126 with light, and displays the image of rear view R of vehicle V. In inside mirror 1, peak angle φ of backlight BL is directed downward with respect to the front direction of liquid crystal panel 126.

According to inside mirror 1, when peak angle φ of backlight BL is adjusted, the maximum luminance direction of the display image of liquid crystal display 12 is shifted toward the sight line direction of the driver. Therefore, luminance deterioration of the visually recognized image in an actual-use state is suppressed, thereby securing excellent visibility. Furthermore, since it is unnecessary to increase an output of backlight BL, an increase in consuming power and an increase in size of inside mirror 1 can be avoided, and moreover, reliability deterioration caused by an increase in temperature can also be avoided.

Although the invention made by the inventor has been specifically described above based on the exemplary embodiment, the present invention is not limited to the above exemplary embodiment, and can be modified without departing from the gist of the present invention.

For example, the electronic mirror device according to the present invention is also applicable to an inside mirror whose use state is fixed. Also in this case, a maximum luminance direction of a display image of a liquid crystal display is shifted toward a sight line direction, thereby improving the visibility. Note that peak angle φ of backlight BL is set within a possible range of first sight line angle α (from α1 to α2 inclusive). With this configuration, the maximum luminance direction of the display image is within in the region of eyellipse E (refer to FIGS. 8A and 8B).

In the inside mirror whose use state is fixed, a light modulating filter may be used instead of one-way mirror 11, as an optical member that reflects incident light from a front surface side, and transmits incident light from a rear surface side. The light modulating filter is a device that can variably control its transmittance and its reflectance, and can achieve at least two states including a light reflecting state and a light transmitting state, when being applied with a voltage. Such a light modulating filter is disclosed in PTL 3, for example.

It should be construed that the exemplary embodiment disclosed herein is illustrative in all aspects, and is not restrictive. The scope of the present invention is represented by the scope of the claims and not by the above description, and it is intended that all modifications within the sense and scope equivalent to the claims are involved in the scope of the present invention.

INDUSTRIAL APPLICABILITY

An electronic mirror device according to the present invention is suitable to an inside mirror that is attached to a vehicle interior and is used for rearward visual recognition.

REFERENCE MARKS IN THE DRAWINGS 1, 1A: inside mirror (electronic mirror device)
2: front seat
3: rear seat
4: camera
5: windshield
6: rear window glass
11: one-way mirror (optical member)
12: liquid crystal display
13: body case
14: supporter
15: operation lever
121: reflection plate (planar light emitter)
122: light guiding panel (planar light emitter)
123: prism sheet
123a: prism surface
124: diffusion sheet
126: liquid crystal panel
127: light source
BL: backlight
V: vehicle
R: rear view

The invention claimed is:

1. An electronic mirror device for a vehicle interior and which is used for rearward visual recognition, the electronic mirror device comprising:
    an optical element that reflects incident light from a first surface side, and transmits incident light from a second surface side, the second surface side being an opposite side of the first surface side;
    a liquid crystal display that includes a liquid crystal panel and a backlight, the liquid crystal panel being proximate to the second side of the optical element and being disposed between the optical element and the backlight, wherein the backlight, in operation illuminates the liquid crystal panel with light and displays an image of a rear view of the vehicle, wherein a direction in which a luminance of the image is maximum is downward with respect to a normal direction of a surface of the liquid crystal panel; and
    a switch that switches a use state between a first use state and a second use state, the first use state being a state in which the optical element and the liquid crystal display are integrally tilted by a predetermined tilting angle and the rearward visual recognition is performed by using a reflected image projected on the first surface of the optical element, and the second use state being a state in which the first surface of the optical element is by an angle larger than the predetermined tilting angle and the rearward visual recognition is performed by using the image of the liquid crystal display,
    wherein an angle between the direction in which the luminance of the image is maximum and the normal direction of the surface of the liquid crystal panel is larger than the predetermined tilting angle.

2. The electronic mirror device according to claim 1, wherein
    a possible range of a sight line angle α in the first use state is defined based on an eyellipse in the vehicle interior to which the electronic mirror device is mounted, and
    when a lower limit value of the sight line angle α is α1, an upper limit value of the sight line angle α is α2, and the tilting angle is θ,
    the angle between the direction in which the luminance of the image is maximum and the normal direction of the surface of the liquid crystal panel ranges from (θ+α1) to (θ+α2) inclusive.

3. The electronic mirror device according to claim 1, wherein a maximum luminance direction of the light illuminated by the backlight is downward with respect to the normal direction of the surface of liquid crystal panel.

4. The electronic mirror device according to claim 3, wherein:

the backlight includes a planar light emitter and a prism sheet that is disposed on a light emitting surface of the planar light emitter and has a prism surface on a side of the light emitting surface, the prism sheet having a reverse prism shape, and the prism surface is vertically asymmetrical.

5. The electronic mirror device according to claim 2, wherein a maximum luminance direction of the light illuminated by the backlight is downward with respect to the normal direction of the surface of the liquid crystal panel.

6. The electronic mirror device according to claim 5, wherein the backlight includes a planar light emitter and a prism sheet that is disposed on a light emitting surface of the planar light emitter and has a prism surface on a side of the light emitting surface, the prism sheet having a reverse prism shape, and the prism surface is vertically asymmetrical.

7. The electronic mirror device according to claim 1, wherein the liquid crystal display and the optical element are arranged generally in parallel.

\* \* \* \* \*